SERIES B

SERIES C

SERIES D

SERIES E

JAMES E. OWEN INVENTOR.

BY Dwight C Pond

United States Patent Office 3,424,551
Patented Jan. 28, 1969

3,424,551
COLORED TITANIUM PIGMENT MATERIALS HAVING A SPINEL STRUCTURE AND METHOD OF PREPARING SAME
James E. Owen, South Euclid, Ohio, assignor, by mesne assignments, to Kewanee Oil Company, Bryn Mawr, Pa., a corporation of Delaware
Filed Dec. 18, 1964, Ser. No. 419,356
U.S. Cl. 23—51          10 Claims
Int. Cl. C09c 1/02; C01g 1/02

ABSTRACT OF THE DISCLOSURE

This invention comprising colored titanium pigment materials having a wide variety of colors, improved color stability, and various other desirable properties, consisting essentially of a pigment of spinel structure comprising co-calcined compounds of titanium, magnesium, cobalt, and zinc selected from the oxides of said metals or compounds adapted to form such oxides upon calcining, the molar amount of each metal being within a specified range.

---

Figure 1:
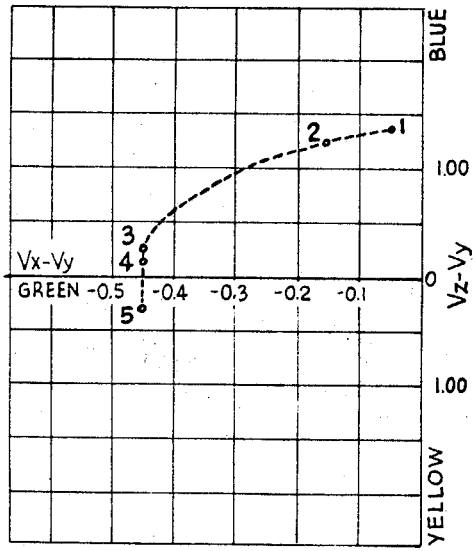

The present invention relates to the production of colored titanium pigment materials exhibiting clean colors, imparting excellent gloss characteristics, and possessing improved color stability while at the same time presenting a wide variety of colors. More particularly, the invention relates to cobalt and zinc-containing colored titanium magnesium oxide pigments having a characteristic spinel structure or configuration. The spinels are, generally speaking, solid solutions in which the unit cell is a closely packed cubic arrangement of 32 anions with 24 cations distributed in certain interstices between the anions. The spinels pertaining to the present invention may be represented by the general formula $A^xB^y_2O_4$. The ionic charges on the A and B cations are such that the sum of these charges ($1x+2y$) equals eight.

In the so-called normal spinel unit cell, A type cations occupy lattice sites formed by four adjoining anions and therefore are considered to be tetrahedrally coordinated, whereas B type cations occupy the lattice sites formed by six adjoining anions and are considered to be octahedrally coordinated. Also known are so-called inverse spinels in which half of the B type cations occupy tetrahedral sites while the remaining A and B cations occupy the octahedral sites.

An example of such an inverse spinel is $Mg_2TiO_4$. It will be appreciated that $Mg^{+2}$ is B and $Ti^{+4}$ is A and that the structure of the unit cell may be represented as $Mg_{16}Ti_8O_{32}$. Therefore in the unit cell of this inverse spinel structure, eight magnesium ions occupy tetrahedral sites and eight occupy octahedral sites while the eight titanium ions occupy other octahedral sites. The 32 oxygen ions are arranged in the closely packed cubic structure identified with the spinels.

Thus, in order to produce the spinel structure, the total number of cations in the unit cell has to be 24, eight cations occupying tetrahedral sites, 16 occupying octahedral sites. Also, the sum of the positive charges of these cations have to balance the sum of the negative charges of the oxygen ions. Various transition metal ions can be incorporated into this spinel structure by replacing part of the magnesium or titanium ions; but if the spinel structure is to be produced or maintained the foregoing conditions must be met. Therefore, the structure of a unit cell including the incorporation of divalent transition metal ions into this system may be represented as follows:

$$Mg_{16-x}M_xTi_8O_{32}$$

M=divalent transitional metal ion. Where M is cobalt, a structure study of the resulting spinel has been considered in the literature, see "Farbe und Konstitution anorganischer Verbindungen," Naturwissenschaften, 41, 477–8 (1954).

However, serious difficulties were encountered in an effort to utilize such cobalt-containing Mg, Ti systems as pigments. In the first place, it is desirable to supply a range of colors and this system produced a very limited group of colors. Moreover, color in this system is related to the concentration of the cobalt; and I have discovered that the intensity of the color is also related to the concentration of the cobalt. Because of these relationships, the sought-for blue-greens and greens were very intense colors, that is, they were highly saturated. Many desired shades such as pastel blue-greens or aquas were not possible to obtain from this system.

Transitional metals other than cobalt have been tried in this system in an effort to overcome these and other difficulties. For example, nickel and chromium have been tried. But, efforts along these lines have not produced satisfactory pigments. In addition to limited color selection, other difficulties encountered have included high temperatures necessary to form the spinel, grave difficulties in obtaining necessary pigment properties in view of such temperatures, difficulty in obtaining clear hues, and the production of a mixture of the spinel structure with appreciable amounts of other structures in an unpredictable way; for example, rutile titanium oxide seemed to be present on occasion and, in some instances, other structures were encountered. These other structures either extensively diluted the effect of the spinel or rendered the material of little or no value as the desired pigments. In this connection it should be particularly noted that a mere mixture of the metallic oxides or oxide-producing materials will not provide the desired pigment materials. Even a mixture of spinels of the types $Mg_{16-x}Co_xTi_8O_{32}$ and $Zn_{16-x}Co_xTi_8O_{32}$ will not result in a pigment material having the distinctive properties of those embodying the present invention.

It would, of course, be possible to produce a large number of spinel materials of the general character discussed herein; but it remains a most difficult problem to produce those having the necessary pigment properties such as color stability, good gloss characteristics and the like while at the same time permitting selection of the desirable shade over a wide range of colors. Such a group of pigment materials may be produced in accordance with the present invention. In a broad aspect, this invention is exemplified by the system $Mg_{16-(x+z)}Co_xZn_yTi_8O_{32}$. In Table 1, the composition and colors of a number of pigments made in this way have been set forth. These pigments appear to be of an inverse spinel structure with the Co and Zn replacing the Mg in part. The colors of the pigments referred to in Table 1 are indicated but generally, and for comparison with each other. In the drawing accompanying this specification, the Adams chromatic values are shown. This system of measuring color values is more easily understood and is explained hereinafter. Also, certain of the pigments shown in Table 1 involve the system $Mg_{16-x}Co_xTi_8O_{32}$; not the zinc-containing system of the present invention. These pigments were included for comparison purposes. It will be noted readily from a review of Table 1 that in all instances the colors produced by the $Mg_{16-x}Co_xTi_8O_{32}$ system were shifted by incorporation of zinc to form the quaternary system from the blue, characteristic of the use of cobalt only, to light blue-green to light green shades. Thus, regardless of the particular concentration of cobalt, blue-greens and green shades which are not intense can be produced by varying the amount of zinc content. Moreover, due to the basic nature of the system, both mass tones and tints can be made by varying the relative concentration of cobalt to zinc as well as by varying the content of zinc or cobalt in and of themselves.

TABLE I

Series A:
1. $Mg_{15}Co_1Ti_8O_{32}$ — Light blue
2. $Mg_{14}Co_1Zn_1Ti_8O_{32}$
3. $Mg_{13}Co_1Zn_2Ti_8O_{32}$ — ↓ Intermediate blue-green
4. $Mg_{12}Co_1Zn_3Ti_8O_{32}$ — Light green
5. $Mg_{11}Co_1Zn_4Ti_8O_{32}$ Series B:
1. $Mg_{14}Co_2Ti_8O_{32}$ — Light blue (darker than A-1)
2. $Mg_{13}Co_2Zn_1Ti_8O_{32}$ — ↓ Blue-green
3. $Mg_{12}Co_2Zn_2Ti_8O_{32}$
4. $Mg_{11}Co_2Zn_3Ti_8O_{32}$ — Light green (darker than A-5)
5. $Mg_{10}Co_2Zn_4Ti_8O_{32}$ Series C:
1. $Mg_{12}Co_4Ti_8O_{32}$ — Light blue (darker than B-1)
2. $Mg_{11}Co_4Zn_1Ti_8O_{32}$ — ↓ Blue-green
3. $Mg_{10}Co_4Zn_2Ti_8O_{32}$
4. $Mg_9Co_4Zn_3Ti_8O_{32}$ — Light green (darker than B-5)
5. $Mg_8Co_4Zn_4Ti_8O_{32}$ Series D:
1. $Mg_{10}Co_6Ti_8O_{32}$ — Dark blue-green
2. $Mg_9Co_6Zn_1Ti_8O_{32}$ — ↓
3. $Mg_8Co_6Zn_2Ti_8O_{32}$
4. $Mg_7Co_6Zn_3Ti_8O_{32}$ — Green
5. $Mg_6Co_6Zn_4Ti_8O_{32}$ — ↓
6. $Co_6Zn_{10}Ti_8O_{32}$ — Mustard color Series E:
1. $Mg_8Co_8Ti_8O_{32}$ — Dark green
2. $Mg_7Co_8Zn_1Ti_8O_{32}$ — ↓
3. $Mg_6Co_8Zn_2Ti_8O_{32}$
4. $Mg_5Co_8Zn_3Ti_8O_{32}$ — Yellow-green
5. $Mg_4Co_8Zn_4Ti_8O_{32}$
6. $Mg_4Co_8Zn_8Ti_8O_{32}$ In order that one skilled in the art may better judge these colors the following procedure has been utilized, that is, a method of locating the colors of particular pigments in color space by means of a system of coordinates was accomplished in the following manner:

The pigment was uniformly dispersed in a vehicle with the assistance of an automatic mulling device such as one possessing relatively rotating glass plates. The Hoover Automatic Muller Model 4 (Hoover Color Corporation, Irvington, N.J.) may be so used. According to the procedure adopted, two grams of the pigments were dispersed in one milliliter of vehicle. The vehicle consisted of 454 grams of linseed oil, such for instance as litho-varnish No. 3 and also included 7.5 grams of a liquid manganese drier containing 6% manganese calculated as the metal. The mulling consisted of two cycles of 50 revolutions each, 150 lbs. of weight being applied to the rotating plates. The resulting pigment dispersion was placed on a opacity chart such as Form 2A of the Lenita Company and a uniform 4-mil film was drawn down with an applicator blade. The film was then allowed to air dry.

The visible reflectance spectra of the dried film were obtained from a General Electric recording spectraphotometer. These data were then fed into a digital computer which was programmed to calculate the tristimulus values and chromaticity coordinates. These calculations were determined under illuminant C conditions of the Commision International de l'Echlairage (C.I.E.). Illuminant C is a standard light source established by the C.I.E. and was intended to simulate overcast-sky daylight. Tristimulus values (XYZ) for a color are the numerical values of three imaginary primaries required to match colors. All colors can be described in terms of the tristimulus values. The chromatic coordinates are determined as follows:

$$x = \frac{X}{X+Y+Z}$$

$$y = \frac{Y}{X+Y+Z}$$

and will locate color in a mathematical manner when plotted on an algebraic graph. Such graphs are often referred to as chromasticity diagrams.

While this system defines a color mathematically from physical measurements, other means of defining colors are needed in order to correlate the visual estimates of color; that is, to obtain a better idea of color to the eye. One system for so doing involves the Adams "chromatic values" see Nickerson, "Munsell Renotations Used to Study Color Space of Hunter and Adams," J. Opt. Soc. Am., 40, 85–88 (1950). In the Adams formulas for "chromatic values," the Munsell function (V) is applied separately to the three tristimulus values X Y, and Z for a given illuminant, such as illuminant C in the present instance. The Munsell value (V) is determined by transforming the tristimulus coordinates by means of a mathematical formula, see Newhall, Nickerson and Judd, J. Opt. Soc. Am., 33, 385 (1943), p. 417. An Adams "chromatic value" diagram may be made by plotting $V_x - V_y$ vs. $V_z - V_y$. It should be noted that Adams has suggested some arbitrary factors in plotting these values such as a factor of 0.4 for the function $V_z - V_y$. For present purposes, however, it has been found that such factors are not necessary and that the chromatic value diagrams adequately delineate the color characteristics of the pigment materials.

In the drawing accompanying this specifications, FIGURES 1–4 inclusive constitute Adams "chromatic value" diagram or algabraic graphs for a group of pigment materials of the present invention.

Figure 2:
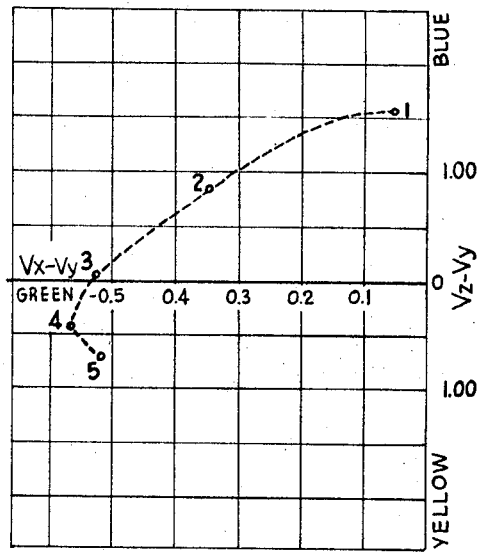
Figure 3:
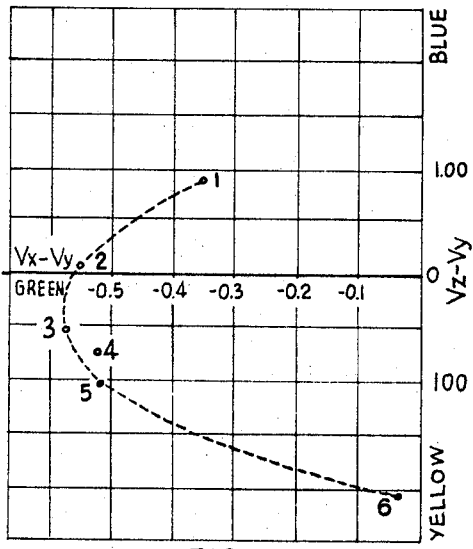
Figure 4:
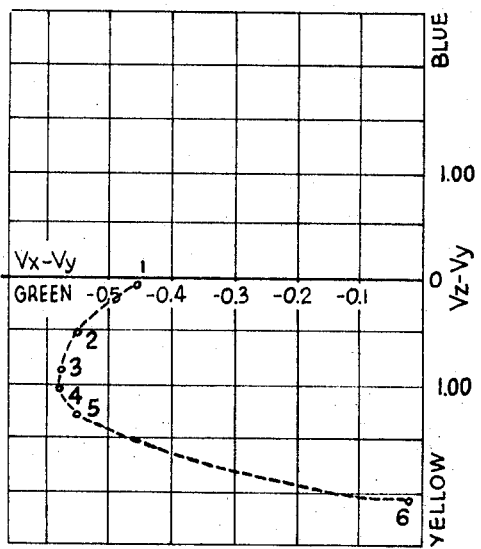

In this drawing:

FIGURE 1 illustrates the Adams chromatic values for the pigments of Series B, Table I, FIGURE 2 illustrates such values for Series C, FIGURE 3 illustrates such values for Series D, and FIGURE 4 illustrates such values for Series E.

It will be appreciated that the vehicle in which the pigment is to be placed, the materials with which it is used, and many other factors importantly influence color perception; and as pointed out above, color itself involves psycophysical factors. Therefore, it is most difficult to define it accurately in mathematical terms, especially by means of a two-dimensional algabraic graph. It is believed that the Adams "chromatic value" diagrams provide one skilled in the art with as accurate a definition of the pigment colors as the limitations of any such system permit. The color itself or hue is well defined by the relative position of the point to the coordinates, and the color saturation or "purity" is indicated by the distance of the point from the origin. The relative intensity or lightness of color is not indicated in this diagram since it is defined by the value of $V_y$. It might, of course, be possible to calculate the value of $V_y$ for each point or to attempt to employ a three-dimensional diagram, but this is not considered practicable or necessary for present purposes.

The pigment materials of the present invention, in addition to presenting desirable colors, possess other properties rendering them particularly effective for the desired pigment uses without additional special treatment such as ball milling. For instance, these pigments were incorporated into paint formulations, and weathering tests were conducted under accelerated conditions which showed that such pigments possessed excellent light and heat stability. Automobile finishes which incorporated these pigments possessed highly desirable gloss characteristics. In addition to these properties another desirable quality of these pigments is the chalking phenomenon. These pigments produced a colored chalk of essentially the same color characteristics as that of the paint system so that the protective coating would not change its appearance during weathering.

Samples of these pigments were dispersed in plastic materials such as polyvinyl chloride with excellent results. The pigments were easily dispersed in the plastic material and produced a uniform product.

These pigments also were utilized as a coloring means for decorations applied to glass substrates. In this connection, the pigments were combined with a low melting lead borosilicate glass. This mixture was applied to a conventional glass substrate and was fired at approximately 625° C. This procedure resulted in a glass substrate which contained a blue-green or green decoration depending upon the pigment selected.

Pigment materials of this invention may be prepared by relatively simple methods. Generally speaking, they may be prepared by mixing substantially stoichiometric quantities of the appropriate metallic oxides or metallic compounds adapted to produce such oxides on calcining, such as the carbonates. Anatase $TiO_2$ was usually used as the source of Ti. A micropulverizer or its equivalent could be used for the mixing operation. The mixture thus produced is calcined in a clay saggar or its production equivalent in an air atmosphere at temperatures ranging between 900° and 1200° C., in most instances, for a period of 1-3 hours depending upon the particular materials. Thus the pigment materials can be prepared with conventional plant facilities, employing known techniques and procedures.

The following examples show ways in which the present invention has been practiced; but should not be construed as limiting the invention. In this specification (unless expressly indicated otherwise) all parts are by weight, all percentages are weight percentages and all temperatures are in degrees centigrade. In this connection it should be noted that in the formulas for such compositions presented herein, the numbers indicating equivalent quantities do not necessarily have to be whole integers. The unit cells may vary somewhat one from another so that the formula may represent a composite or average.

EXAMPLE I.—$Mg_{13}Co_2Zn_1Ti_8O_{32}$ 10.96 g. (0.13 mole) $MgCO_3$, 2.37 g. (0.02 mole) $CoCO_3$, 1.25 g. (0.01 mole) $ZnCO_3$ and 6.4 g. (0.08 mole) $TiO_2$ (anatase) were intimately mixed in a Waring Blendor for a 2-minute period. The mixture was placed in a clay saggar and fired at 900° C. for a period of 1-hour. The resulting product was blue in color.

EXAMPLE II.—$Mg_{11}Co_2Zn_3Ti_8O_{32}$ 9.28 g. (0.11 mole) $MgCO_3$, 2.37 g. (0.02 mole) $CoCO_3$, 3.75 g. (0.03 mole) $ZnCO_3$ and 6.4 g. (0.08 mole) $TiO_2$ (anatase) were intimately mixed in a Waring Blendor for a 2-minute period. The mixture was placed in a clay saggar and fired at 900° C. for a period of 1 hour. The resulting product was blue-green in color.

EXAMPLE III.—$Mg_{10}Co_2Zn_4Ti_8O_{32}$ 8.43 g. (0.10 mole) $MgCO_3$, 2.37 g. (0.02 mole) $CoCO_3$, 5.00 g. (0.04 mole) $ZnCO_3$ and 6.4 g. (0.08 mole) $TiO_2$ (anatase) were intimately mixed in a Waring Blendor for a period of 2 minutes. The mixture was placed in a clay saggar and fired at 900° C. for 1 hour. The resulting product was green in color.

EXAMPLE IV.—$Mg_{11}Co_4Zn_1Ti_8O_{32}$ 9.28 g. (0.11 mole) $MgCO_3$, 1.25 g. (0.01 mole) $ZnCO_3$, 4.76 g. $CoCO_3$ and 6.40 g. (0.08 mole) $TiO_2$ (anatase) were intimately mixed in a Waring Blendor. The mixture was placed in a clay saggar and fired at 900° C. for a 1-hour period. The resulting product was blue-green in color.

EXAMPLE V.—$Mg_9Co_4Zn_3Ti_8O_{32}$ 7.48 g. (0.09 mole) $MgCO_3$, 4.76 g. (0.04 mole) $CoCO_3$, 3.75 g. (0.03 mole) $ZnCO_3$ and 6.40 g. (0.08 mole) $TiO_2$ (anatase) were intimately mixed in a Waring Blendor for a 2-minute period. The mixture was placed in a clay saggar and fired at 900° C. for a period of 1 hour. The resulting product was green in color.

EXAMPLE VI.—$Mg_9Co_6Zn_1Ti_8O_{32}$ 7.48 g. (0.09 mole) $MgCO_3$, 1.25 g. (0.01 mole) $ZnCO_3$, 7.14 g. (0.06 mole) $CoCO_3$ and 6.40 g. $TiO_2$ (anatase) were intimately mixed in a Waring Blendor for a 2-minute period. The mixture was placed in a clay saggar and fired at 900° C. for a period of 1 hour. The resulting product was green in color.

EXAMPLE VII.—$Mg_7Co_6Zn_3Ti_8O_{32}$ 5.83 g. (0.07 mole) $MgCO_3$, 7.14 g. (0.06 mole) $CoCO_3$, 3.75 g. (0.03 mole) $ZnCO_3$ and 6.40 g. $TiO_2$ (anatase) were intimately mixed in a Waring Blendor for a period of 2-minutes. The mixture was placed in a clay saggar and fired at 900° C. for a period of 1 hour. The resulting product was yellow-green in color.

EXAMPLE VIII.—$Mg_7Co_8Zn_1Ti_8O_{32}$ 5.83 g. (0.07 mole) $MgCO_3$, 9.51 g. (0.08 mole) $CoCO_3$, 1.25 g. (0.01 mole) $ZnCO_3$ and 6.40 g. $TiO_2$ (anatase) were intimately mixed in a Waring Blendor for a period of 2 minutes. The mixture was placed in a clay saggar and fired at 900° C. for a period of 1 hour. The resulting product was dark green in color.

EXAMPLE IX.—$Mg_5Co_8Zn_3Ti_8O_{32}$ 4.16 g. (0.05 mole) $MgCO_3$, 9.51 g. (0.08 mole) $CoCO_3$, 3.75 g. (0.03 mole) $ZnCO_3$ and 6.40 g. (0.08 mole) $TiO_2$ (anatase) were intimately mixed in a Waring Blendor for a period of 2 minutes. The resulting mixture was placed in a clay saggar and fired at 900° C. for a period of 1 hour. The resulting product was a dark-yellow-green.

EXAMPLE X.—$Mg_{12}Co_2Zn_2Ti_8O_{32}$ 10.11 g. (0.12 mole) $MgCO_3$, 2.37 g. (0.02 mole) $CoCO_3$, 2.50 g. (0.02 mole) $ZnCO_3$, and 6.40 g. (0.08 mole) $TiO_2$ anatase were intimately mixed in a Waring Blendor. The mixture was placed in a clay saggar and fired at 1200° C. for a period of 1 hour. The resulting product possessed a very bright blue-green color. (Under similar firing conditions, the composition without zinc, $Mg_{14}Co_2Ti_8O_{32}$ was blue in color.)

I claim:
1. A single phase colored pigment comprising, on a weight basis, 0.05 to 0.1 mole titanium, 0.01 to 0.15 mole magnesium, 0.10 to 0.80 mole cobalt and 0.10 to 0.40 mole zinc, said metals being associated together in a spinel structure.

2. A compound of inverse spinel structure having the general formula $$Mg_{16-(x+y)}Co_xZn_yTi_8O_{32}$$

wherein $x$ ranges from 1 to 8 inclusive and $y$ is a positive number less than $(16-x)$.

3. A colored titanium pigment of inverse spinel structure consisting essentially of $Mg_{11}Co_4Zn_1Ti_8O_{32}$.

4. A colored titanium pigment of inverse spinel structure consisting essentially of $Mg_9Co_6Zn_1Ti_8O_{32}$.

5. A colored titanium pigment of inverse spinel structure consisting essentially of $Mg_7Co_8Zn_1Ti_8O_{32}$.

6. A colored titanium pigment of inverse spinel structure consisting essentially of $Mg_{11}Co_2Zn_3Ti_8O_{32}$.

7. A colored titanium pigment of inverse spinel structure consisting essentially of $Mg_{12}Co_2Zn_2Ti_8O_{32}$.

8. The method of making a single phase pigment of inverse spinel structure containing four separate metal ions comprising intimately mixing finely ground compounds of titanium, magnesium, cobalt and zinc, said compounds being selected from the group consisting of oxides of said metals and compounds of said metals which form such oxides on calcination, the amounts of said metals in said intimate mixture on a weight basis being

| | Moles |
|---|---|
| Ti | 0.05–0.1 |
| Mg | 0.01–0.15 |
| Co | 0.10–0.80 |
| Zn | 0.10–0.40 | and calcining said intimate mixture at a temperature of 900 to 1200° C. for a period of approximately 1–3 hours.

9. The method of making a single phase pigment of inverse spinel structure containing four separate metal ions comprising intimately mixing approximately stoichiometric quantities of finely ground compounds of titanium, magnesium, cobalt and zinc so that the composition of the mixture based on the oxides of metals correspond in amount to the formula $$Mg_{16-(x+y)}Co_xZn_yTi_8O_{32}$$

wherein $x$ ranges from 1 to 8 inclusive and $y$ is a positive number less than $(16-x)$ and calcines said intimate mixture at a temperature of 900 to 1200° C. for a period of approximately 1–3 hours, said compounds being selected from the group consisting of oxides of said metals and compounds of said metals which form such oxides on calcination.

10. The method of making a single phase pigment of inverse spinel structure containing four separate metal ions comprising intimately mixing stoichiometric quantities of anatase titania, magnesium carbonate, cobalt carbonate and zinc carbonate the amounts of said materials in said intimate mixture when converted to the oxides and present in the ratio indicated by the formula $$Mg_{16-(x+y)}Co_xZn_yTi_8O_{32}$$

wherein $x$ ranges from 1 to 8 inclusive and $y$ is a positive number less than $(16-x)$ and calcining said intimate mixture at a temperature of 900 to 1200° C. for a period of approximately 1–3 hours.

References Cited

UNITED STATES PATENTS

| | | | |
|---|---|---|---|
| 2,139,686 | 12/1938 | Lederle et al. | 106—292 |
| 2,579,020 | 12/1951 | Smith | 106—288 |

OTHER REFERENCES

Schmitz-Dumont et al.: "Die Naturwissenschaften," Jahrg, 41, 1954, pages 477–478.

OSCAR R. VERTIZ, *Primary Examiner.*

H. T. CARTER, *Assistant Examiner.*

U.S. Cl. X.R.

106—292, 299